United States Patent
Hartikainen et al.

(10) Patent No.: US 7,218,923 B2
(45) Date of Patent: May 15, 2007

(54) CONTROL OF TERMINAL APPLICATIONS IN A NETWORK ENVIRONMENT

(75) Inventors: Auvo Hartikainen, Tampere (FI); Kari Silfverberg, Mouhijarvi (FI); Markku Kontio, Palojoki (FI); Kari Miettinen, Klaukkala (FI); Isaac De La Pena, Espoo (FI); Elina Aho, Tampere (FI); Arto Tiihonen, Oulu (FI); Arto Pussinen, Oulu (FI); Juha P. Hartikainen, Oulu (FI)

(73) Assignee: Nokia Corporation, Espoo (FI)

( * ) Notice: Subject to any disclaimer, the term of this patent is extended or adjusted under 35 U.S.C. 154(b) by 233 days.

(21) Appl. No.: 10/862,878

(22) Filed: Jun. 8, 2004

(65) Prior Publication Data
US 2005/0135388 A1 Jun. 23, 2005

(30) Foreign Application Priority Data
Dec. 18, 2003 (FI) .................................. 20031860

(51) Int. Cl.
*H04M 3/00* (2006.01)
(52) U.S. Cl. .................. 455/418; 455/410; 455/411; 709/207; 709/246; 707/717
(58) Field of Classification Search ............... 455/411, 455/410, 418; 709/207, 246; 717/177; 707/717
See application file for complete search history.

(56) References Cited

U.S. PATENT DOCUMENTS

| | | | | |
|---|---|---|---|---|
| 5,908,265 | A * | 6/1999 | Mostkoff ...................... | 405/29 |
| 6,836,548 | B1 * | 12/2004 | Anderson et al. ............. | 380/28 |
| 2003/0115280 | A1 * | 6/2003 | Quine et al. ................. | 709/207 |
| 2004/0019626 | A1 * | 1/2004 | Shepherd et al. ........... | 709/202 |
| 2004/0199586 | A1 * | 10/2004 | Kaler et al. ................. | 709/206 |
| 2005/0144619 | A1 * | 6/2005 | Newman ..................... | 717/177 |

\* cited by examiner

*Primary Examiner*—Danh Cong Le
(74) *Attorney, Agent, or Firm*—Squire, Sanders & Dempsey, LLP.

(57) ABSTRACT

A mechanism and method for controlling the rights and/or behavior of applications in a terminal, especially in a mobile terminal, are disclosed. At least some of the messages generated by an application residing in the terminal and destined for a communication network are diverted to an independent controlling entity also residing in the terminal. In the controlling entity, the messages are controlled before being transmitted to the network. Depending on the application and its behavior in the terminal, the control entity may modify the messages or even prevent their sending to the network. The modification may include inserting control data, such as a digest, which can be used to authenticate the application.

40 Claims, 6 Drawing Sheets

CONTROL OF TERMINAL APPLICATIONS IN A NETWORK ENVIRONMENT

FIELD OF THE INVENTION

The present invention relates generally to control of applications residing in a communication terminal, especially in a mobile terminal. More particularly, the invention relates to a mechanism for controlling the rights and/or behavior of terminal applications in a network environment.

BACKGROUND OF THE INVENTION

The current development towards truly mobile computing and networking has brought on the evolvement of various access technologies, which also provide the users with access to the Internet when they are outside their own home network. The first public communication network that provides a truly ubiquitous World Wide Web (WWW) access is the GSM-based mobile telephone network.

So far, the use of the Internet has been dominated by person-to-machine communications, i.e. information services. The evolution towards the so-called third generation (3G) wireless networks brings along mobile multimedia communications, which will also change the way IP-based services are utilized in public mobile networks. The IP Multimedia Subsystem (IMS), as specified by the 3rd Generation Partnership Project (3GPP), integrates mobile voice communications with Internet technologies, allowing IP-based multimedia services to be utilized in mobile networks.

The new multimedia capable mobile terminals (multimedia phones) provide an open development platform for application developers, allowing independent application developers to design new services and applications for the multimedia environment. The users may, in turn, download the new applications/services to their mobile terminals and use them therein.

A drawback related to the open development platform is the possibility to use fraudulent applications. At present, the mobile terminals and the mobile communication environment lack sufficient technical means for ascertaining that the applications developed for the open platform behave in an appropriate and rightful manner. This allows deceptive application developers to misuse the new communication environment and to develop applications that behave contrary to the agreements made with the operator of the network, for example.

The present invention seeks to eliminate the above-described drawback.

SUMMARY OF THE INVENTION

The present invention seeks to bring about the necessary mechanisms, for both terminals and networks, for efficiently controlling the behavior of applications residing in a terminal, especially in a mobile terminal, and for eliminating the possibility to misuse another application in place of a valid application.

In the present invention, the control mechanisms rest on a separate controlling entity residing in a terminal. At least some of the outbound messages generated by an application in a terminal are diverted to the controlling entity on their way from the application to the network. The controlling entity evaluates whether any changes are needed in the message or in the behavior of the application. Based on the evaluation, the control entity then returns the message intact or in a modified form. The controlling entity may even prohibit the sending of the message, if it detects that the application has no pertinent rights or that the application is not behaving, as it should. The controlling entity resides in a tamper resistant area of the terminal, so that its operation cannot be affected by the user or other parties that are beyond the control of the network operator. The outbound messages of an application are thus controlled by a controlling entity, which is totally independent of the applications residing in the terminal. Due to its nature, the controlling entity is also termed the trusted agent in this context.

Thus one embodiment of the invention is the provision of a method for controlling applications in a communication terminal. The method includes the steps of sending messages from an application towards a communication network, where the application resides in the communication terminal, and diverting at least one message destined for the communication network to a controlling entity residing in the communication terminal. The method also includes controlling, in the controlling entity, the at least one message diverted to it before being transmitted from the communication terminal to the communication network.

In another embodiment the invention provides a terminal for a communication system. The terminal includes one or more applications configured to send messages towards a communication network and diverting means for diverting selected messages sent from an application and destined for the communication network to a controlling entity residing in the terminal, where the controlling entity is configured to control the selected messages before it is to be transmitted to the communication network.

The invention also provides the mechanisms needed in the network for controlling the applications residing in a terminal, the mechanisms resting on the above operation of the controlling entity. One embodiment the invention thus provides a system for authenticating applications in a communication network. In a communication terminal the system includes at least one application configured to send messages towards the communication network and diverting means for diverting at least some of the messages sent from an application and destined for the communication network to the controlling entity residing in the terminal, the controlling entity being configured to add control data to at least some of the messages diverted to it. In the communication network the system further includes authentication means for receiving the control data, the authentication means being configured to initiate authentication of the application in response to reception of the control data. The system further includes connection set-up means, responsive to the authentication means, for setting up a connection when the application is successfully authenticated by the authentication means.

By means of the solution of the invention, certain open platform applications, which the users may use in their terminals, can be efficiently controlled so that the applications cannot misuse the communication environment.

In one embodiment of the invention, an application is authenticated by having the controlling entity provide an initial message sent by the application towards the network with a digest or digital signature, which is verified in the network prior to the setting up of a session. In this way, the network may ensure that the message was generated by an application that is controlled in the terminal so that misuse is not possible. This allows the network operators to use application-specific billing without a risk of misuse of the terms of an invoicing agreement, for example.

BRIEF DESCRIPTION OF THE DRAWINGS

In the following, the invention and many of its embodiments are described more closely with reference to the examples shown in FIGS. 1 to 10 in the appended drawings, wherein.

FIG: 9 illustrates another embodiment of the invention for utilizing the control mechanism of the terminal for authenticating an application.

DETAILED DESCRIPTION OF THE INVENTION

Figure 1:
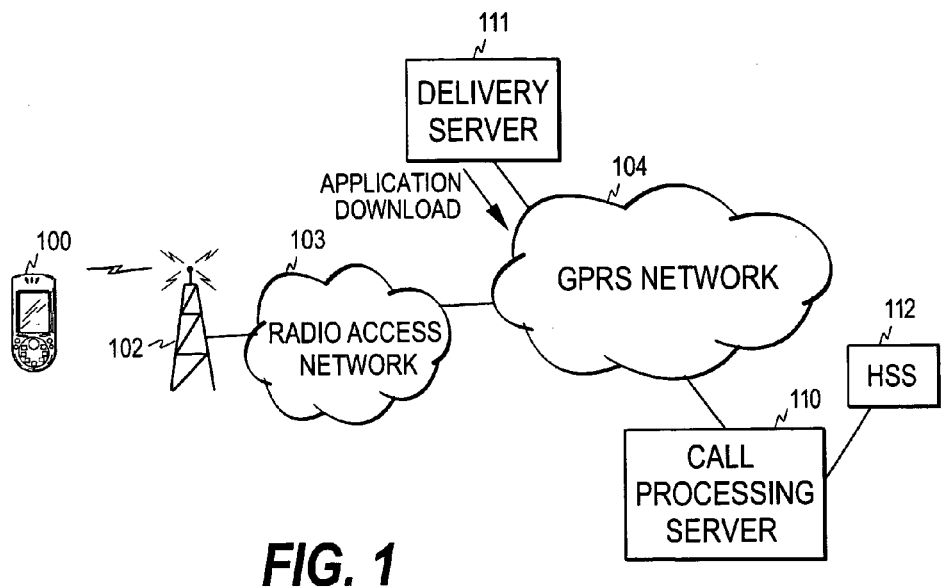
FIG. 1 illustrates an example of a communication environment in which the principles of the present the invention may be beneficially implemented.

FIG. 1 shows an example of a general communication environment in which the present invention can be applied, the communication environment being based on the IMS architecture as defined by the 3GPP. It is thus assumed here that a call processing server 110 includes the Call State Control Functions (CSCF) according to the IMS architecture and that it is connected to the core network elements, such as the Home Subscriber Server (HSS) 112, needed for provision of multimedia services. The HSS contains the master database for a given user. The call processing server, which also generates billing data for a separate billing system (not shown in the figure), is connected to a General Packet Radio Service (GPRS) network 104. The GPRS network is further connected to a Radio Access Network (RAN) 103 comprising a plurality of base stations 102 with which mobile terminals 100 communicate through a radio interface. The user of a mobile terminal is thus a subscriber in a mobile communication system, such as the GSM or UMTS system, while the terminal is typically a multimedia phone. A delivery server 111, from which applications may be downloaded to the mobile terminals is connected to the GPRS network, either directly or through another packet network, such as the Internet.

Figure 2:
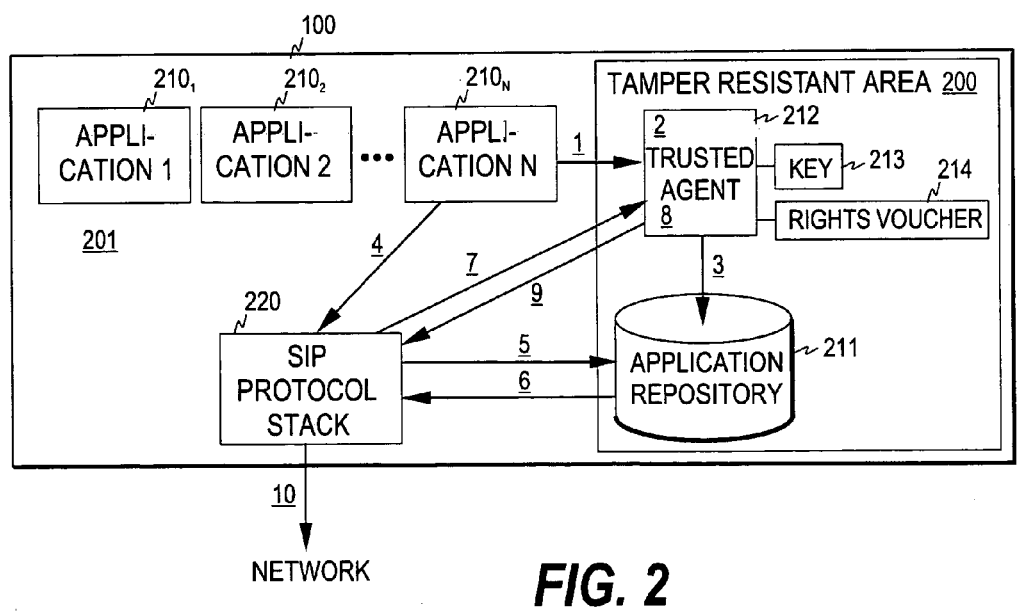
FIG. 2 illustrates one embodiment of a mobile terminal according to the invention.

FIG. 2 is a schematic illustration of one embodiment of a terminal according to the invention. The entities relevant to the invention reside in a tamper resistant area 200 of the terminal or in an open platform area 201. The tamper resistant area includes at least one trusted agent 212, which acts as a controlling entity controlling the rights and behavior of the applications. The trusted agent may be a dedicated software agent or a Digital Rights Management (DRM) agent whose normal functionality has been modified for the method of the invention. The open platform area in turn includes a plurality of applications $210_1$ to $210_N$ which may be downloaded from the delivery server 111, for example. The applications access the network through a protocol stack 220, which is a Session Initiation Protocol (SIP) stack in this environment. The tamper resistant area may further include an application repository 211 that includes identifiers of applications that need to be controlled by the trusted agent 212. The arrows provided with underlined numbers 1–10 present the cooperation of the different terminal entities when an authorized application residing in the terminal is started.

The applications are typically downloaded in encrypted form from the delivery server. When a user downloads an encrypted application, the encrypted application instance is normally accompanied with a rights module including a key 213 for decrypting the application and a rights voucher 214, which expresses the rights acquired by the user for the application. As also discussed below, it is assumed here that the key and the rights voucher are utilized according to the normal functionality of a DRM agent.

Figure 3:
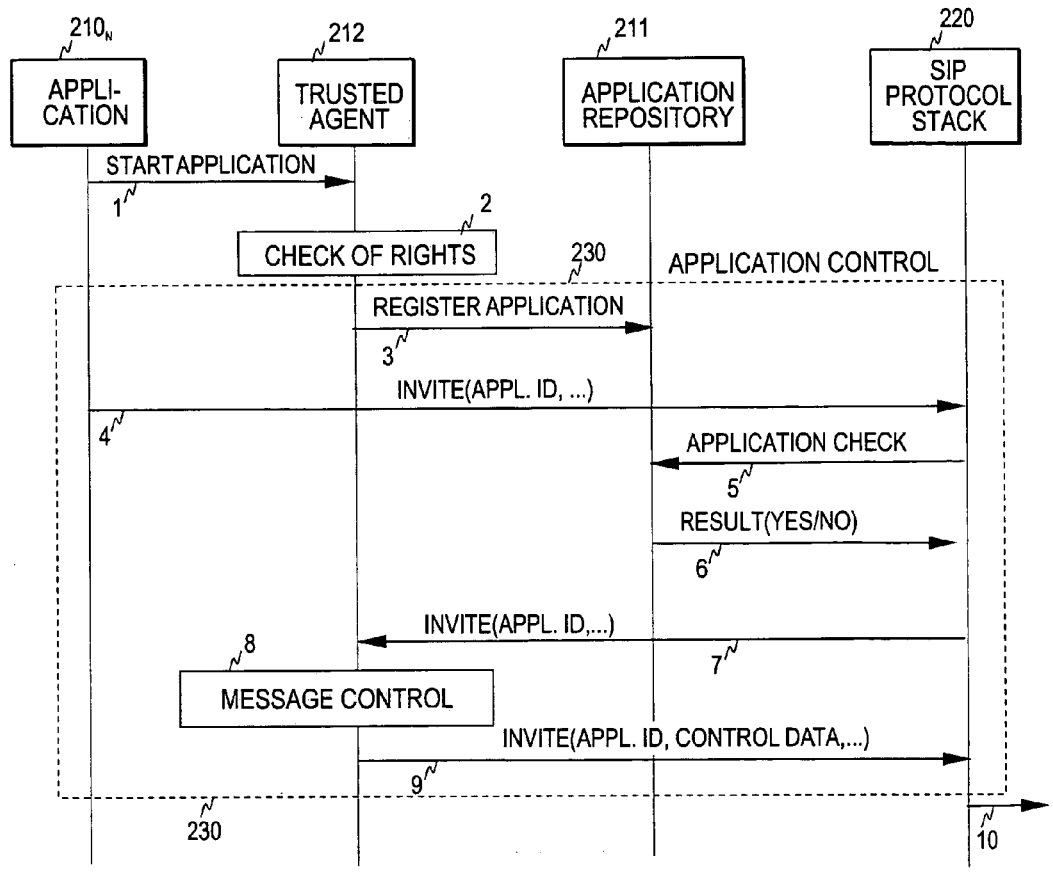
FIG. 3 illustrates one embodiment of a message exchange between the different entities in the terminal of FIG. 2.

FIG. 3 illustrates the message exchange between the above terminal entities, when an application is started. Reference numbers 1–10 correspond to the steps provided with like numbers in FIG. 2. It is assumed here that the user of the mobile terminal 100 starts application $210_N$. This may be a chess application, for example, in which case the user wants to play chess with the user of another mobile terminal containing a similar chess application.

When the user starts the application, the application communicates (step 1) with the trusted agent. The trusted agent checks (step 2) the rights of the application and allows the decryption of the application if it detects that the application is legally downloaded from the delivery server or is otherwise legally acquired. The checking of the rights and the decryption of the application is normally handled by the DRM agent, so if there is a separate trusted agent in addition to a normal DRM agent, these steps may be handled by the DRM agent.

In connection with the decryption of the application, the trusted agent also writes the identifier of the application to the application repository, if it detects that the application is such that its behavior needs to be controlled (step 3). If there is a separate trusted agent in addition to a normal DRM agent in the terminal, the DRM agent may transfer the control of the operation to the trusted agent before the writing event.

After the decryption, the application starts a session by sending an INVITE request according to the SIP protocol to the opposite terminal (step 4). The INVITE request invites the opposite terminal to participate in the session, which is here assumed to be a chess session, and it includes a description of the session, for example. The INVITE request further includes the identifier of the application, which is then utilized by the SIP protocol stack. When the protocol stack receives the outbound INVITE request generated by the application, it checks from the application repository whether the application is such that it needs to be controlled (step 5). If the application identifier is found in the repository, the repository returns a positive response (step 6) indicating that the application needs to be controlled. When the protocol stack receives the positive response, it sends the INVITE request to the trusted agent (step 7). The trusted agent then examines the request and checks, whether the application behaves as it should be behaving (step 8). The trusted agent may modify the request, for example by adding control data, such as control parameters, to the request. As discussed below, the trusted agent may also prohibit the sending of the request. If the trusted agent allows the sending of the request, it returns the request, either as such or in a modified form, to the SIP protocol stack (step 9). The protocol stack then transmits the INVITE request to the network (step 10).

If the response at step 6 from the application repository is negative, the protocol stack transmits the INVITE request directly to the network, i.e. the INVITE request is not sent to the trusted agent.

In one embodiment of the invention, the applications are authenticated by means of the above mechanism. In another embodiment, the mechanism is utilized for ensuring that authorized applications obey the SIP policies of the operator. The authentication of the applications is discussed first.

Figure 4:
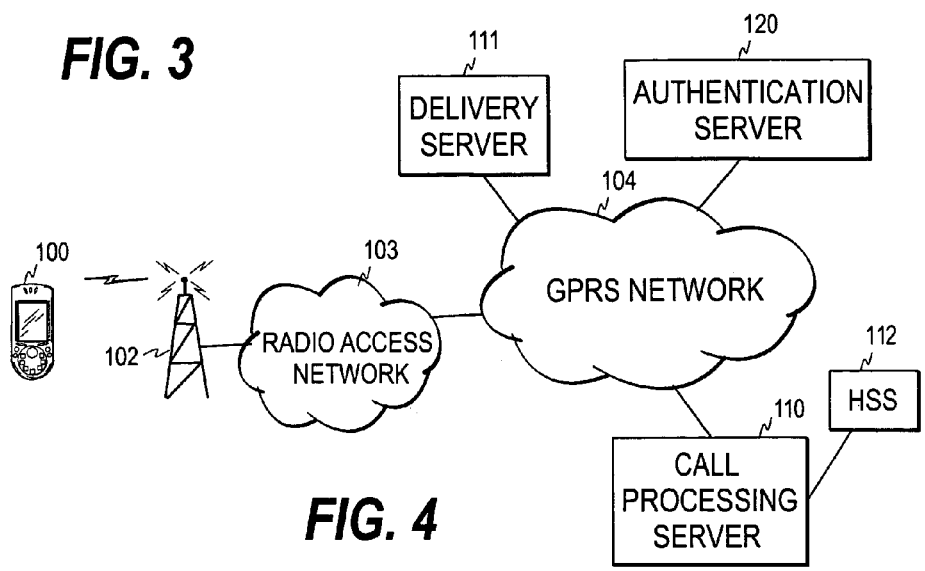
FIG. 4 illustrates another example of a communication environment in which the principles of the present the invention may be beneficially implemented.

FIG. 4 shows an example of a general communication environment in which the authentication of the applications can be implemented. The communication environment now includes an authentication server 120 for authenticating the application before a session is set up. Otherwise the environment may be as discussed in connection with FIG. 1.

Figure 5:
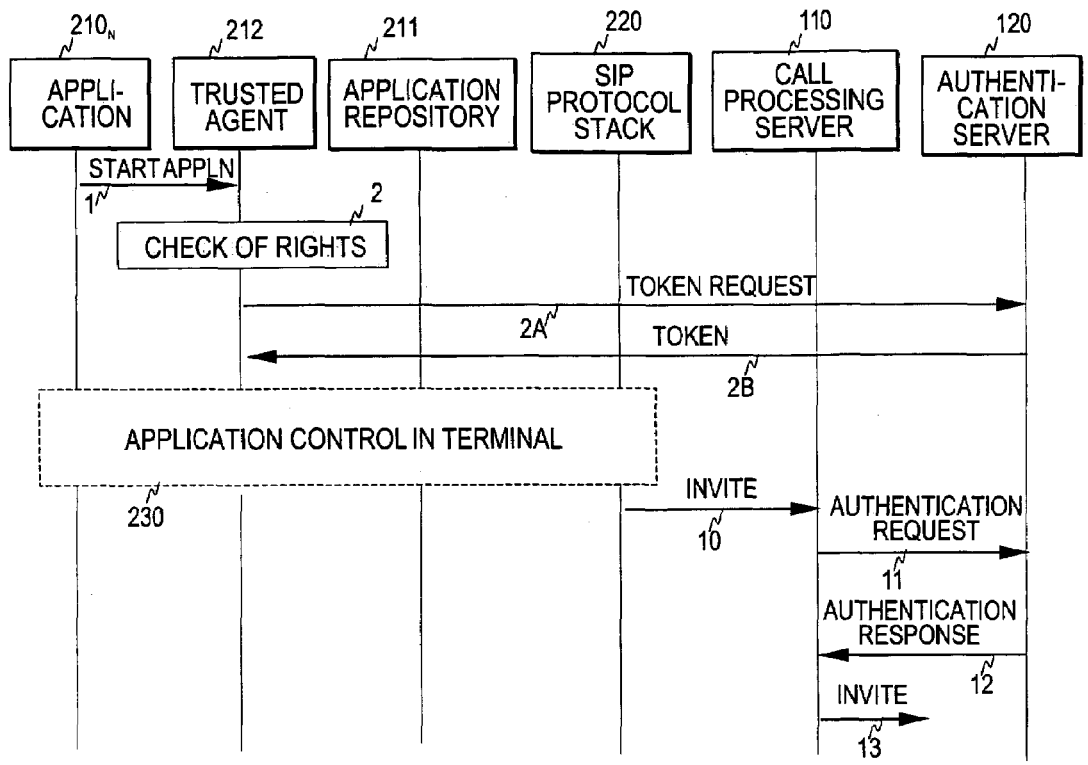
FIG. 5 illustrates one embodiment of the invention for utilizing the control mechanism of the terminal for authenticating an application.

FIG. 5 illustrates one embodiment of the message exchange in the environment of FIG. 4. When the application is started, the trusted agent first checks the rights of the application (step 2). If the rights are valid, the trusted agent sends a token request to the authentication server (step 2A) requesting a token for the session that is about to start. In response to the request, the authentication server returns a token to the trusted agent (step 2B). The token request may include, for example, the subscriber identifier in question so that the authentication server will be able to associate a subsequent authentication request with the correct token. The token is typically a random number used in digest calculation, i.e. it is different for each request (session) in order to eliminate misuse by replaying messages. When the trusted agent has received the token, the application control continues as discussed in connection with FIGS. 2 and 3. Reference numeral 230 in FIG. 5 refers to the block marked with the same reference numeral in FIG. 3. However, in the example of FIG. 5 the trusted agent modifies the INVITE request by adding a digest, or a digital signature, to the INVITE request at step 8. In other words, in the embodiment of FIG. 5 the control data shown in the modified INVITE request of FIG. 3 includes a digest.

The INVITE request is then transmitted (step 10) to the call processing server, which now performs an additional authentication step in order to authenticate the application. For this purpose, the call processing server sends an authentication request to the authentication server (step 11). This authentication request includes, in addition to the digest, the subscriber identifier so that the authentication server is able to identify the correct token it previously assigned for this session. The authentication request may also include the whole INVITE request (including the subscriber identifier). Based on the token found, the authentication server calculates a digest and compares it with the digest received in the authentication request. The token may also be transmitted to the authentication server, whereby no other search keys are needed for identifying the correct token in the authentication server.

The digest may be calculated in a standard manner using the same algorithm in the terminal and in the authentication server and using a secret key, the token, and possibly also other predetermined data, such as the subscriber identifier, as the input data for the algorithm, which then outputs the digest. The secret key may be a symmetric key (shared secret) or the private key of the trusted agent. In the latter case the authentication server uses the public key of the trusted agent. The algorithm used may be the MD5 or the SHA-1, for example. As discussed below, the secret key may received in connection with each application download (the key in the rights module), or a key stored permanently in the tamper resistant area may be used for the authentication of the applications.

If the authentication server detects that the digest calculated by it matches the digest received in the authentication request, the application is successfully authenticated. In other words, the authentication server can be sure that the application is controlled by the trusted agent in the terminal, and therefore no misuse is possible in the terminal.

The authentication server then returns an authentication response to the call processing server (step 12). If the response indicates that the authentication was successful, the call-processing server forwards the INVITE request to the opposite terminal (step 13) and generates a charging record for the session. However, if the authentication did not succeed, the call processing server sends an error message to the terminal.

The above-described embodiments of the terminal may be modified by omitting the use of the application repository, for example. In this case, the SIP protocol stack sends the INVITE request of each authorized application to the trusted agent, since it cannot be sure whether the application is such that it needs to be controlled. The trusted agent then examines whether any control operations are needed.

Figure 6:
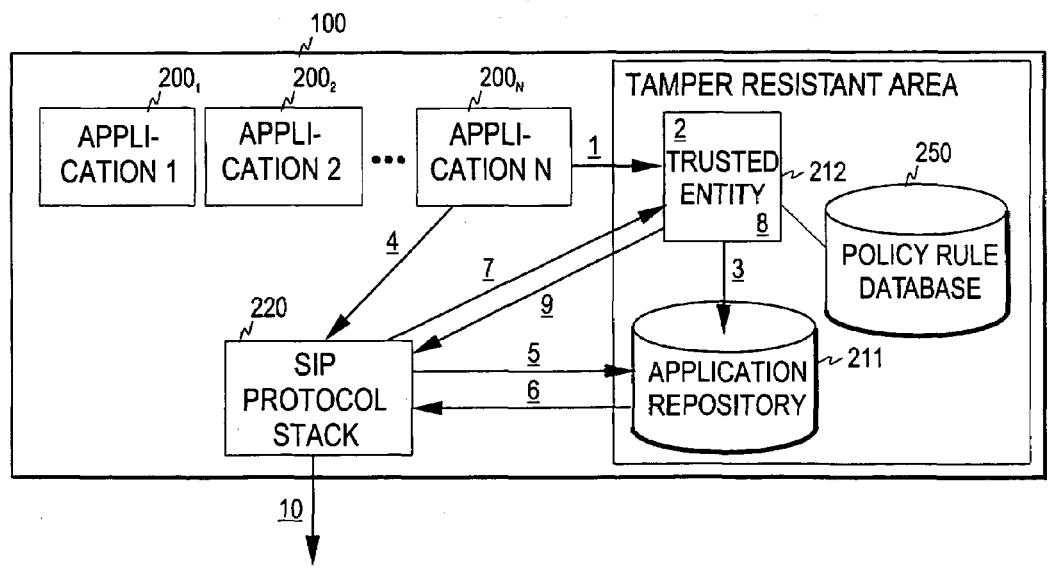
FIG. 6 illustrates another embodiment of a mobile terminal according to the invention.

As mentioned above, in one embodiment of the invention the applications are controlled to ensure that they obey the policies set by the operator. In this embodiment of the invention, the tamper resistant area includes the policy rules set for the terminals. As shown in FIG. 6, which illustrates this embodiment of the terminal, the rules may be stored in a separate database 250 in the tamper resistant area. The operation of the terminal corresponds to that described in connection with FIGS. 2 and 3, except that in this embodiment the trusted agent compares the behavior of the application to the policy rules at step 8. Moreover, in this embodiment the type(s) of the messages may be different. Depending on the result of the comparison, the trusted agent may then allow or prohibit the sending of the message, for example. The policy rules may also be stored in the application repository, if the repository is used in the terminal. The policy rules may include, for example, load parameters that indicate whether an application is causing excessive load. A default set of the policy rules may be stored in the tamper resistant area in the manufacturing phase of the terminal, and/or the operator may be able to download policy rules into the tamper resistant area.

Figure 7:
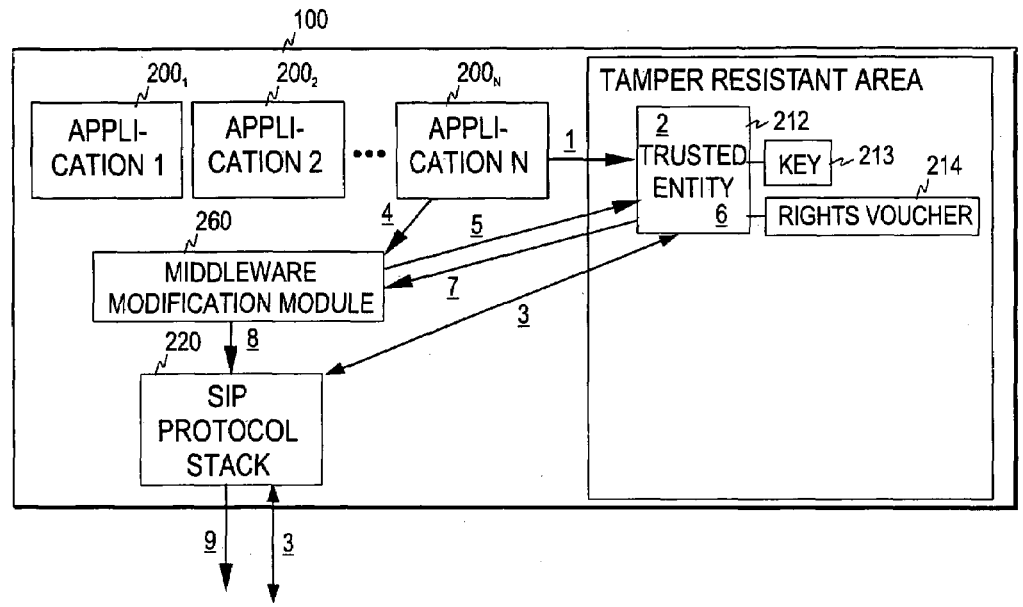
FIG. 7 and FIG. 8 illustrate two further embodiments of a mobile terminal according to the invention.
Figure 8:
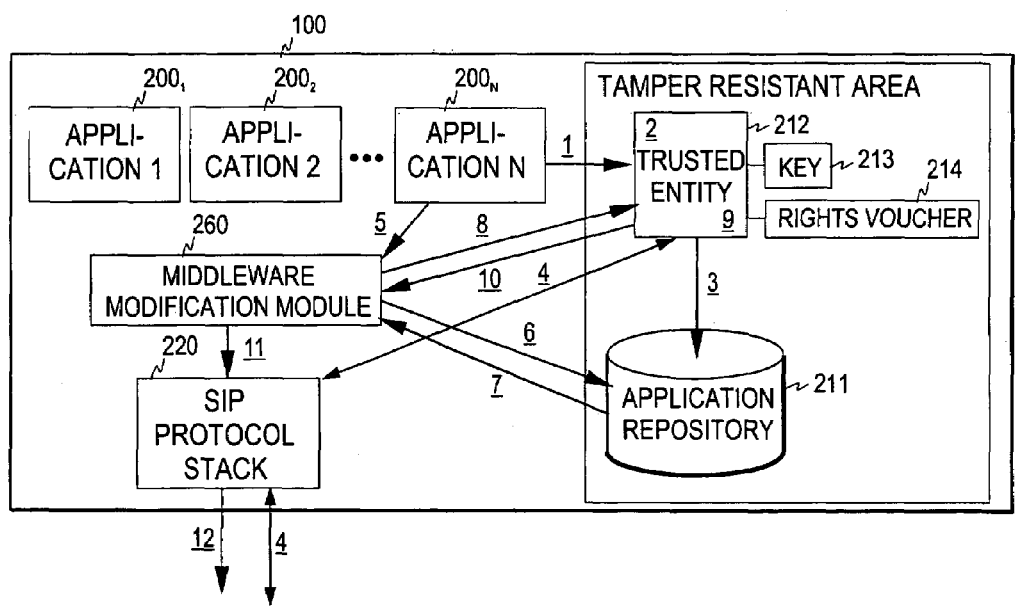

The functionality needed in the SIP protocol stack may be introduced as changes made within the protocol stack, as is assumed in the above examples. Alternatively, the functionality may be introduced as a separate middleware modification module that resides between the application(s) and the protocol stack and which thus also provides an Application Program Interface (API) for the applications. This embodiment is illustrated in FIGS. 7 and 8. In FIG. 7 it is assumed that no application repository is utilized in the tamper resistant area, but that the middleware modification module 260 sends all the INVITE requests to the trusted agent (step 5 in the figure). FIG. 8 shows an embodiment with the application repository. It is further assumed in FIG. 7 and FIG. 8 that the trusted agent fetches the token from the network (steps 3 and 4, respectively) after the rights of the application have been checked (steps 1 and 2). The token may also be fetched after the application has been started, since the INVITE request is in any case diverted to the trusted agent for the addition of the digest.

The above-described mechanism cannot prevent unauthorized applications, i.e. applications that are not approved by the operator, from being used in the terminal. Rather, the above mechanism prevents an unauthorized application from being used in place of a valid application. If the use unauthorized applications is also to be eliminated, the SIP stack must be moved to the tamper-proof area or the possibility to change the SIP stack is to be eliminated otherwise. In the above examples, it is assumed that the SIP stack (or the middleware modification module) can be changed but the trusted agent offers its services only to a valid SIP stack (or middleware modification module).

Figure 9:
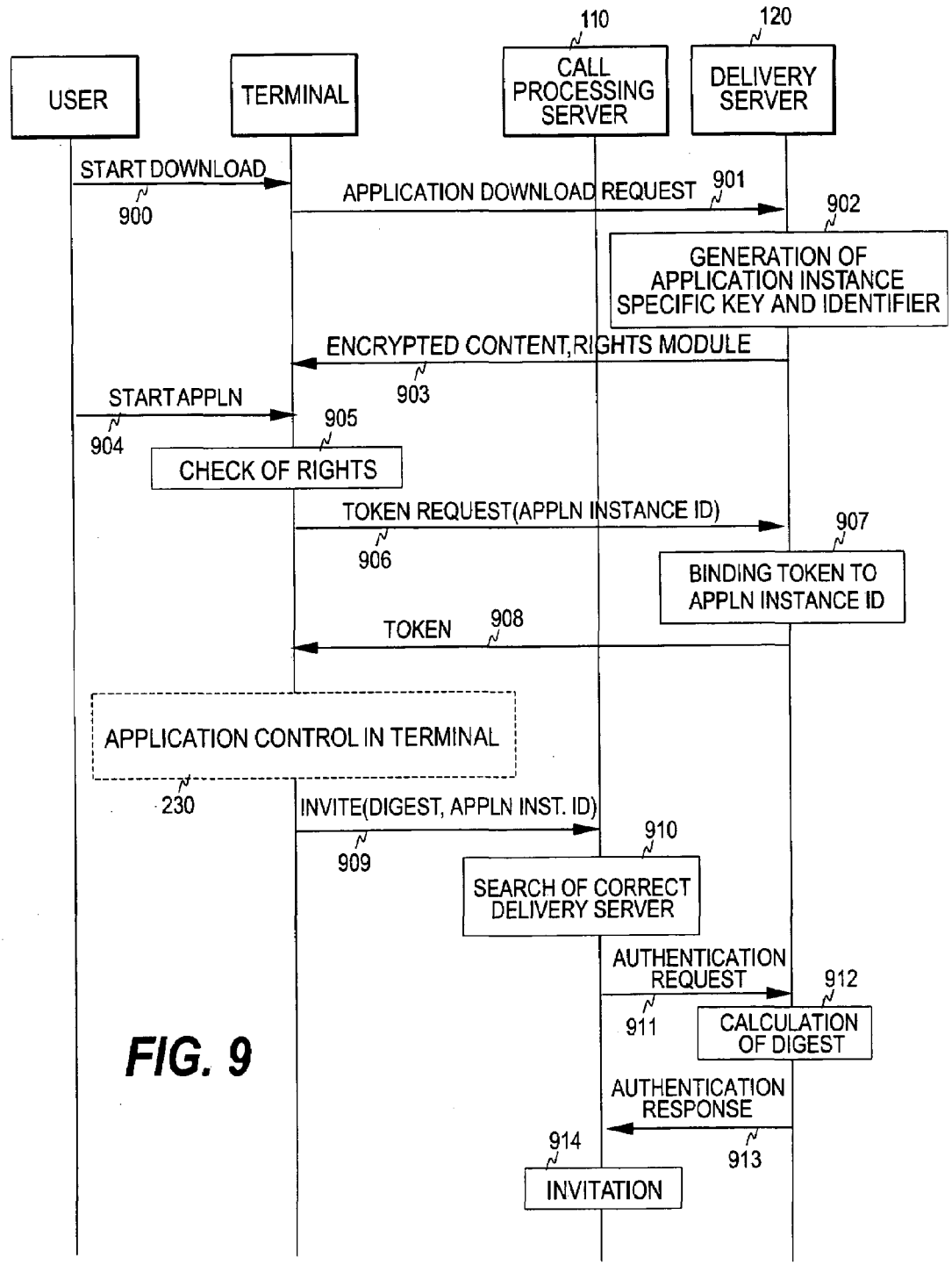

The authentication of the application may also be performed in another network element than the authentication server. FIG. 9 illustrates an example, in which the authentication occurs in the delivery server. When the user decides to download an application from the delivery server (step 900), a download request is sent from the terminal to the delivery server (step 901). In response to the request, the delivery server generates a secret key and an identifier, which are specific to the application instance to be sent to the user (step 902). The delivery server then sends the encrypted content (application) to the terminal, together with a rights module that includes a key and the identifier generated (step 903). When the application is started (step 904), the trusted agent checks the rights of the application (step 905) and sends a token request to the delivery server if the rights are valid (step 906). The token request includes the identifier of the application instance. Upon receiving the request, the delivery server generates a token, associates it with the identifier of the application instance (step 907), and returns the token to the terminal (step 908). When the trusted agent has received the token, the application control may continue as discussed in connection with FIGS. 2 and 3. Reference numeral 230 in FIG. 9 refers to the block marked with the same reference numeral in FIG. 3. However, in the example of FIG. 9 the trusted agent may now modify the INVITE request by adding the digest and the identifier of the application instance to the INVITE request (which includes the user identity in the message header). This INVITE request is sent to the call processing server (step 909), which finds out the correct delivery server (step 910) and sends the authentication request to that delivery server (step 911). The authentication request includes the digest, the identifier of the application instance, and the identifier of the user. Based on the binding established earlier at step 907, the delivery server finds the correct token, whereby it can calculate the digest and compare the calculated digest with the digest received in the authentication request (step 912). The delivery server then returns the authentication response to the call processing server (step 913). If the response indicates that the authentication was successful, the call processing server may then invite the other party/parties to the session (step 914). However, if the authentication did not succeed, the call processing server sends an error message to the terminal.

In the example of FIG. 9, the calculation of the digest is based on an application-instance-specific secret key generated by the delivery server in connection with the download of the application, i.e. different keys are generated for each download of a particular application (such as a chess application) by the delivery server. It is also possible that an application-specific (i.e. not instance-specific) secret key is generated by the delivery server, in which case different keys are generated for different applications. However, as mentioned above, the authentication may also be based on a public/private key pair or a shared secret, which may not be application-specific. The private key and a certificate (including the corresponding public key) may be stored in the terminal already in the manufacturing phase, for example. If the authentication process utilizes a permanent private key stored in the tamper-resistant area, all the applications are authenticated by means of the same key. In case of a key that is not application-specific, the trusted entity is actually the entity authenticated. However, as in this case the authenticating entity can be sure that the application is controlled by the trusted agent in the terminal, the authentication of the application here refers to all the above alternative uses of a key/shared secret.

The authentication may also be introduced into the call processing server, for example, or the authentication server may be in connection with the delivery server or the call processing server. However, if the authentication process utilizes application-specific or application-instance-specific keys generated by the delivery server and another entity than the delivery server acts as the authenticating entity, the keys must be transferred to the said another entity.

In one embodiment of the invention, the terminal may fetch several tokens at a time and use them one by one. Each time an application is started, the terminal takes one of the tokens fetched and uses it for calculating the digest. Once a token is used, it is discarded. In this embodiment, token identifiers may be used to indicate the token used at each time. The authenticating entity (such as the delivery server) may send the identifiers together with the tokens to the terminal, and the terminal may insert the token identifier in the INVITE request, whereby the authenticating entity may perform the authentication based on the correct token.

Figure 10:
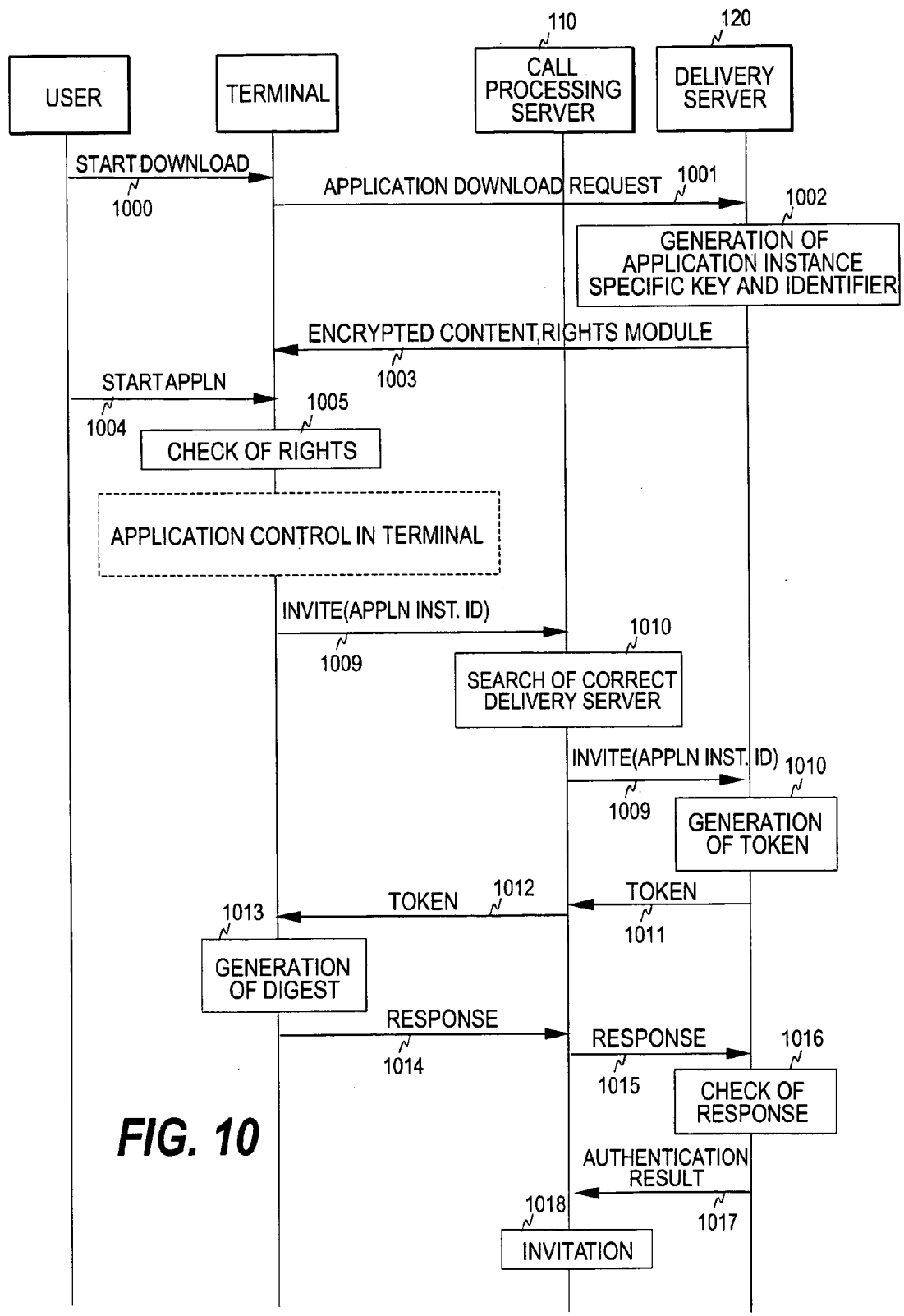
FIG. 10 illustrates still another embodiment of the invention for utilizing the control mechanism of the terminal for authenticating an application.

In another embodiment of the invention, the call processing server challenges the terminal after the INVITE request is sent. In this embodiment, which is illustrated in FIG. 10, the download and the start of the application (steps 1000 to 1005) as well as the application control in the terminal may be performed as disclosed above. However, the token request is not sent prior to the INVITE request, but the terminal first sends an INVITE request failing to include the digest (step 1009). When the delivery server receives the INVITE request, it generates a token (step 1010) and sends it to the terminal. The terminal then calculates the digest based on the token and returns the digest to the delivery server, which then also calculates the digest and compares it with the digest received from the terminal (step 1016). The authentication result is then sent to the call processing server (step 1017), and the process continues in the above-described manner.

In still another embodiment of the invention, the terminal and the authenticating entity, such as the delivery server, are provided with their respective counters. The terminal increments its counter each time an application is started and uses the counter value for the calculation of the digest. The authenticating entity in turn increments its counter each time a digest is checked. In this way no token needs to be transmitted, since the counter value acts as a token. However, a synchronization mechanism is needed for the counters to maintain them synchronized.

Although the invention was described above with reference to the examples shown in the appended drawings, it is obvious that the invention is not limited to these, but may be modified by those skilled in the art without departing from the scope and spirit of the invention. For example, in the above examples the mutual order of some messages may be changed and one message shown in the examples may in practice comprise more than one message. The mechanism may also be applied to other type of messages than the above-mentioned INVITE request, especially if the behavior of the applications is controlled. If the communication is session-based, the authentication needs to be performed only for the message initiating the session, while in an event-based communication each message needs to be authenticated. The mechanism may also be used in another than the above-described IMS-based environment, in which case the protocol stack used may also be another than an SIP stack.

The invention claimed is:

1. A method for controlling application programs in a communication terminal, the method comprising:
sending messages from an application program towards a communication network, the application program residing in a communication terminal;
diverting a message of the messages to a controlling entity residing in the communication terminal; and
based on the message, controlling in the controlling entity whether the application program behaves in a predetermined manner in the communication terminal, the controlling being performed before the message is transmitted from the communication terminal to the communication network.

2. The method according to claim 1, further comprising:
checking, prior to the sending of the messages, a right related to the application program, the right indicating whether the application program is authorized to run in the terminal.

3. The method according to claim 2, wherein the controlling comprises modifying the message diverted to the controlling entity.

4. The method according to claim 1, wherein the controlling comprises preventing the message diverted to the controlling entity from being transmitted to the communication network.

5. The method according to claim 1, further comprising:
storing a plurality of application programs in the communication terminal; and
maintaining a repository including application program identifiers for the plurality of application programs for which the diverting and controlling are to be performed.

6. The method according to claim 5, further comprising:
examining whether the diverting and controlling are performed for the message sent from the application program towards the network,
wherein the examining comprises comparing an application program identifier of the application program identifiers within the message with the application program identifiers stored in the repository.

7. The method according to claim 6, wherein the examining further comprises examining a message type.

8. The method according to claim 1, wherein the diverting comprises diverting the messages to the controlling entity.

9. A method for controlling application programs in a communication terminal, the method comprising:
sending messages from an application program towards a communication network, the application program residing in a communication terminal;
diverting a message of the messages to a controlling entity residing in the communication terminal;
controlling the message in the controlling entity before the message is transmitted from the communication terminal to the communication network, wherein the controlling comprises modifying the message diverted to the controlling entity;
checking, prior to the sending the messages, a right related to the application program, the right indicating whether the application program is authorized to run in the terminal; and
authenticating the application program in response to reception of the message modified by the modifying.

10. The method according to claim 9, further comprising: creating a token for the authenticating.

11. The method according to claim 10, further comprising:
retrieving the token from a first network node,
wherein the creating is performed in the first network node.

12. The method according to claim 11, wherein the retrieving is responsive to the checking.

13. The method according to claim 11, further comprising:
downloading the application program from a second network node to the communication terminal.

14. The method according to claim 13, wherein the modifying comprises:
calculating a digest based on the token and a secret key; and
adding the digest in the message diverted to the controlling entity.

15. The method according to claim 14, further comprising:
generating the secret key in the second network node; and
transferring the secret key to the communication terminal.

16. The method according to claim 15, wherein the transferring comprises performing the transferring in connection with the downloading.

17. The method according to claim 15, wherein the downloading comprises downloading the application program from the second network node, in which the first and second network nodes are the same.

18. The method according to claim 14, wherein the authenticating comprises verifying the digest.

19. The method according to claim 18, wherein the verifying comprises verifying the digest in the first network node.

20. The method according to claim 9, wherein the modifying comprises adding an identifier in the message diverted to the controlling entity, wherein the identifier identifies the application program.

21. The method according to claim 20, wherein the authenticating comprises:
generating a token in response to reception of the message including the identifier; and
sending the token to the communication terminal.

22. The method according to claim 21, further comprising:
calculating, in the communication terminal, a digest based on the token and a secret key.

23. The method according to claim 22, wherein the authenticating comprises verifying the digest calculated in the communication terminal.

24. A terminal for a communication system, the terminal comprising:
an application program configured to send messages towards a communication network; and
a diverting unit configured to divert a message of the messages sent from the application program and destined for the communication network to a controlling entity residing in the terminal,
wherein the controlling entity is configured to control, based on the message and before the message is transmitted to the communication network, whether the application program behaves in a predetermined manner in the communication terminal, and wherein the terminal is a terminal of a communications system.

25. The terminal according to claim 24, wherein the controlling entity is configured to check a right related to the application program, the right indicating whether the application program is authorized to be run in the terminal.

26. The terminal according to claim 24, wherein the controlling entity is configured to reside in a tamper resistant area of the terminal.

27. The terminal according to claim 24, wherein the controlling entity is configured to add a digest in the message.

28. The terminal according to claim 24, wherein the controlling entity is configured to add an identifier in the message, and wherein the identifier is configured to identify the application program.

29. The terminal according to claim 24, wherein the diverting unit comprises a software module residing between the application program and a protocol stack residing in the terminal.

30. The terminal according to claim 24, wherein the diverting unit is introduced into a protocol stack residing in the terminal.

31. The terminal according to claim 24, further comprising:

a repository comprising application program identifiers for determining whether the message sent by the application program is diverted to the controlling entity.

32. The terminal according to claim 24, wherein the terminal comprises a mobile terminal.

33. A system for authentication application programs in a communication network, the system comprising:

an application program to send messages towards a communication network;

diverting means for diverting a message of the messages sent from the application program and destined for the communication network to a controlling entity residing in a terminal;

the controlling entity configured to add control data to the message;

authentication means for receiving the control data to initiate authentication of the application program in response to reception of the control data; and connection set-up means, responsive to the authentication means, for setting up a connection when the application program is successfully authenticated by the authentication means.

34. The system according to claim 33, wherein the authentication means comprises authentication means both for receiving the control data that includes a digest calculated based on a secret key and a token, and for verifying the digest.

35. The system according to claim 33, wherein the system further comprises:

a delivery server for delivering application programs to communication terminals, wherein the delivery server located in the communication network.

36. The system according to claim 35, wherein the delivery server is configured to generate a secret key in connection with a download of the application program from the delivery server to the terminal.

37. The system according to claim 33, wherein the control data comprises an identifier identifying the application program.

38. The system according to claim 35, wherein the authentication means is configured to send a token to the terminal in response to reception of an identifier for calculating a digest in the terminal, and wherein the authentication means is configured to verify the digest.

39. A system for controlling application programs in a communication terminal, the system, comprising:

sending means for sending messages from an application program towards a communication network, the application program residing in a communication terminal;

diverting means for diverting a message of the messages to a controlling entity residing in the communication terminal; and the controlling entity configured to control, based on the message and before the message is transmitted from the communication terminal to the communication network, whether the application program behaves in a predetermined manner in the communication terminal.

40. A terminal for a communication system, the terminal, comprising:

an application program configured to send messages towards a communication network;

diverting means for diverting a message of the messages sent from the application program and destined for the communication network to a controlling entity residing in the terminal, wherein the controlling entity is configured to control, based on the message and before the message is transmitted to the communication network, whether the application program behaves in a predetermined manner in the communication terminal, and wherein the terminal is a terminal of a communications system.

* * * * *